(No Model.)
W. B. HINTON.
TRACE FOR SINGLE HARNESS.
No. 424,984. Patented Apr. 8, 1890.
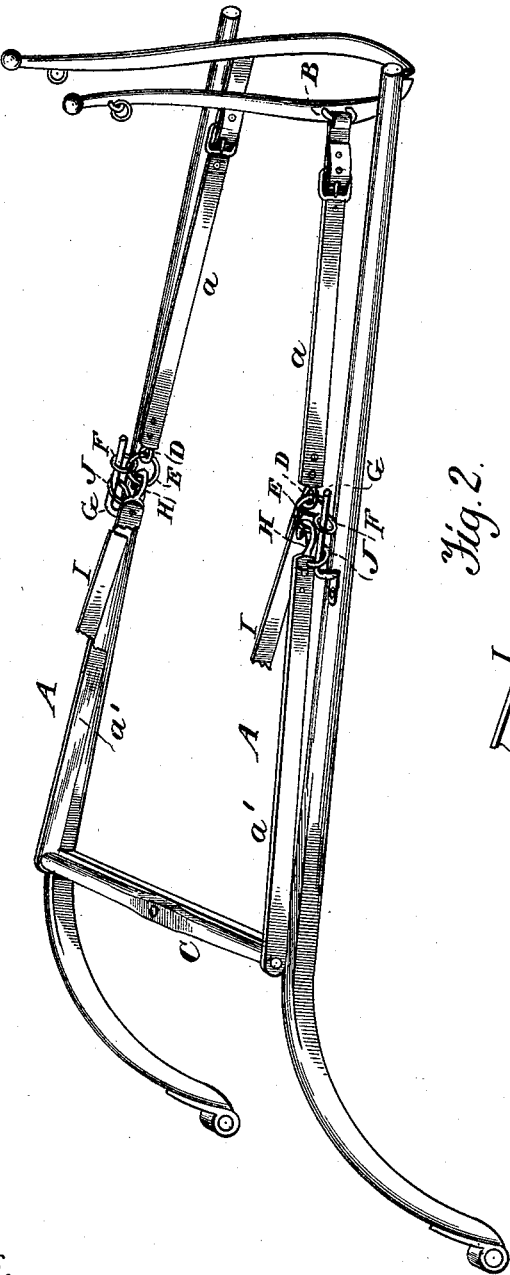
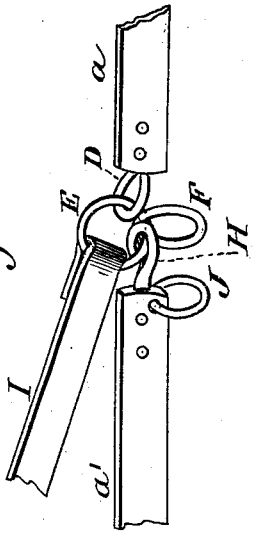
Witnesses.
A. Ruppert.
H. A. Daniels
Inventor.
Wm B. Hinton,
Per
Thomas P. Simpson
Atty.

UNITED STATES PATENT OFFICE.

WILLIAM B. HINTON, OF SMITHVILLE, GEORGIA.

TRACE FOR SINGLE HARNESS.

SPECIFICATION forming part of Letters Patent No. 424,984, dated April 8, 1890.

Application filed November 11, 1889. Serial No. 329,900. (No model.)

*To all whom it may concern:*

Be it known that I, WILLIAM B. HINTON, a citizen of the United States, residing at Smithville, in the county of Lee and State of Georgia, have invented certain new and useful Improvements in Traces for Single Harness; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a trace for single harness in two pieces detachable from each other, the front one being buckled into the hame-tug part of any ordinary trace and the rear one being attached to the whiffletree and shaft, as hereinafter fully described.

Figure 1 of the drawings is a perspective view of my trace connecting with hame-tug, shaft, and whiffletree; Fig. 2, an enlarged detail view of the parts which connect the sections of trace with each other, with the shaft-hook, and with the breeching-strap.

In the drawings, A represents the trace in two detachable sections $a$ $a'$, the former connecting with the hame-tug B and the latter with the whiffletree C by any preferred means. The trace-section $a$ is provided at its rear end with the eye D, ring E passing through said eye, and a ring (or loop of leather) F, passing through the ring E, receives the thill or shaft hook G. The ring E also receives the holdback-strap I of the breeching.

The trace-section $a'$ has in alignment therewith and on its front end a snap-hook H, which connects detachably with the ring E. Said trace-section $a'$ also connects by a small ring J with the shaft just in the rear of the thill or shaft hook G simply to retain this section of trace in position when not in use. The ring (or loop of leather) F moves back and forth on the shaft-hook G in accordance with the motion of the horse and whiffletree.

The holdback-strap I remains buckled to the ring E of the front trace-section; hence it is only necessary to unsnap the hook H from the ring E, when the horse is detached and may walk out of the shafts.

Having thus described my invention, what I wish to protect by Letters Patent is—

A trace for single harness, consisting of two sections $a$ $a'$, the front section being provided with rings D E F, the rear section having a ring J, adapted to be connected with the shaft-hook, and snap-hook H, the ring E being adapted to connect with the breeching-strap and snap-hook, substantially as shown and described.

In testimony whereof I affix my signature in presence of two witnesses.

WILLIAM B. HINTON.

Witnesses:
    H. L. LONG,
    W. L. JENNINGS.